United States Patent [19]

De Bie et al.

[11] Patent Number: 5,444,675
[45] Date of Patent: Aug. 22, 1995

[54] CASSETTE ADAPTER FOR A PLAYBACK DECK OF THE FRONT-LOADING OR THE SIDE-LOADING TYPE

[75] Inventors: Boele De Bie; Willem L. Van Der Kruk, both of Eindhoven, Netherlands; George T. H. Woo, Kowloon, Hong Kong

[73] Assignee: U.S. Philips Corporation, New York, N.Y.

[21] Appl. No.: 218,789

[22] Filed: Mar. 28, 1994

[30] Foreign Application Priority Data

Mar. 31, 1993 [EP] European Pat. Off. ............ 93200915

[51] Int. Cl.⁶ .................................................. H04B 1/20
[52] U.S. Cl. ................................... 369/2; 369/289; 174/65 R
[58] Field of Search ..................... 369/1, 2, 9–10, 369/11–12, 4–5, 289; 360/137, 110; 174/65 R; 381/86; 439/459

[56] References Cited

U.S. PATENT DOCUMENTS

| | | | |
|---|---|---|---|
| 4,287,388 | 9/1981 | Beer et al. | 369/21 X |
| 4,734,897 | 3/1988 | Schotz | 369/2 |
| 5,161,131 | 11/1992 | Borchardt et al. | 369/1 |
| 5,307,326 | 4/1994 | Osawa | 369/2 |

FOREIGN PATENT DOCUMENTS 23701 of 1979 Japan .

*Primary Examiner*—Ali Neyzari
*Attorney, Agent, or Firm*—Edward W. Goodman

[57] ABSTRACT

An adapter, for enabling signals produced by a signal source to be reproduced as audio sounds by a cassette player audio system having a cassette audio playback deck of the front-loading type or the side-loading type, includes a housing of a configuration of a cassette normally used with the playback deck, a record head supported in a peripheral front wall of the housing, an electrical conductor located partly within the housing and extending from the housing, the conductor having one end electrically coupled to the record head. The housing includes a first opening in a peripheral side wall of the housing, for enabling the conductor to extend from the adapter from the sidewall thereof, such that the adapter may be used with a playback deck of the side-loading type. The housing further includes a preformed second opening, which is closed by a closure, which is located in a peripheral rear wall of the housing. In the event that the playback deck is of the front-loading type, the housing is disassembled, the closure is removed, the conductor positioned in the second opening, and the housing is then re-assembled.

9 Claims, 5 Drawing Sheets

CASSETTE ADAPTER FOR A PLAYBACK DECK OF THE FRONT-LOADING OR THE SIDE-LOADING TYPE

BACKGROUND OF THE INVENTION

1. Field of the Invention

The invention relates to an adapter for enabling signals produced by a signal source to be reproduced as audio sounds by a cassette player audio system comprising a cassette audio playback deck of the front-loading type or the side-loading type, wherein a cassette is normally positioned in use substantially completely within the confines of said cassette playback deck, said adapter comprising:

- a housing of a configuration of a cassette normally used with said playback deck,
- a record head supported in a peripheral front wall of said housing in a position for contacting a playback head of said playback deck,
- electrical conducting means located partly within said housing and extending from said housing, the conducting means having one end electrically coupled to said record head for providing audio signals to said record head,
- connector means coupled to an other end of the said electrical conducting means, for receiving the audio signals for providing to the record head,
- a first opening in a peripheral side wall of said housing, for enabling the conducting means to extend from said adapter from the sidewall thereof, such that the adapter may be used with a playback deck of the side loading type,
- means being provided in a peripheral rear wall of said housing opposite said record head for enabling the conducting means to extend from said adapter from the rear wall thereof, such that the adapter may be used with a playback deck of the front-loading type.

2. Description of the Related Art

Such an adapter is known from U.S. Pat. No. 4,287,388. The adapter described is in the form of a compact cassette. The first opening in the peripheral side wall and the means provided in the peripheral rear wall of the housing of the adapter are combined into one opening provided in the back corner of the cassette housing. The connecting means loosely extend through said corner opening so that insertion of the adapter in a playback device of the front-loading type or the side-loading type is possible, without an obstruction by the connecting means.

The known adapter has the disadvantage that the connecting means that loosely extend through the corner opening might break during continuous use of the adapter. Further, the corner opening enables dust to enter the adapter.

SUMMARY OF THE INVENTION

The invention has for its object to offer an improved adapter. To this end, the adapter in accordance with the invention is characterized in that, the electrical conducting means are fixedly positioned in said first opening after final assembly of said adapter for consumer use, the means provided in said peripheral rear wall comprising a preformed second opening and closure means for closing said second opening, the housing comprising two housing parts being assembled by means of releasable assembling means so as to enable a de-assembling of both housing parts, the electrical conducting means being releasably positioned in said first opening in one of said housing parts after de-assembly of said housing parts so as to enable a repositioning of the conducting means from the first opening into the preformed second opening after removing the closure means, that the electrical conducting means are fixedly positioned in said second opening after the subsequent assembly of said adapter for use of said adapter with said playback deck of the front-loading type. Fixedly positioning the connecting means in the first opening improves the mechanical construction of the connecting means so that the electrical conductors in the connecting means will not break that easily. Further, repositioning the connecting means is only possible when de-assembling both housing parts. This enables the user to realize the second opening in the rear peripheral wall by removing the closure means.

The reason for the connecting means to extend from the first opening in the side wall, is that present day playback decks, such as they are incorporated in carradios, are of the side-loading type. Therefore, no repositioning of the connecting means are needed, resulting in a cassette adapter which is substantially dust free. For the decreasing number of cassette playback decks of the front loading type that are still in the market, the cassette adapter enables the repositioning of the connecting means, so that it is possible to use the adapter in playback decks of the front-loading type as well.

The adapter may be further characterized in that, the closure means comprise break-away means for breaking away so as to obtain said preformed second opening. More preferably, the closure means further comprise a releasable closure body, and that the releasable closure body and said first opening are shaped so as to position the closure body in said first opening for enabling the closure body to close said first opening when the conducting means are fixedly positioned in the preformed second opening after the subsequent assembly of said adapter. This enables a substantially dust free adapter to be obtained, even after repositioning the connecting means.

In another embodiment, the adapter may be further characterized in that, the closure means are in the form of releasable closure means being accommodated in said preformed second opening. The closure means can be in the form of a releasable plug inserted in the second opening. Repositioning the connecting means to the second opening, and repositioning the plug in the first opening results again in a substantially dust free adapter.

In again another embodiment of the invention, the adapter is provided with the first opening and the preformed second opening being located near the corner between said peripheral side and rear wall, and is characterized in that, the electrical conducting means are shaped such so as to form the closure means, and that the first and second openings are shaped such that, when the electrical conducting means is positioned in the first opening, it closes the second opening, and when the electrical conducting means is positioned in the second opening, it closes the first opening. In this case, no additional elements for closing the unused opening is needed.

It should be noted that published Japanese utility model application no. 23701/1979 discloses an adapter having a first opening in the peripheral side wall and a second opening in the peripheral rear wall. The opening that is not used by the connecting means is however not provided with closure means, so that dust may still enter the adapter.

It should further be noted that U.S. Pat. No. 4,734,897 discloses an adapter having a first opening in the peripheral side wall and a second opening in the peripheral rear wall. The adapter is however not provided with closure means to close the unused opening. Further, the known adapter enables the repositioning of the connecting means from the opening in the sidewall to the opening in the rear wall via a slot interconnecting the two openings. Repositioning the connecting means via the slot however results in wear of the connecting means, so that in the end, the electrical connection will be cut.

It will be appreciated that, in those markets where playback decks of the front-loading type are commonly used, the electrical conducting means extend from the rear-wall of the adapter, after final assembly of the adapter for consumer use.

BRIEF DESCRIPTION OF THE DRAWINGS

These and further objects of the invention will be further described in relation to a number of embodiments of the adapter in the following figure description, wherein.

DESCRIPTION OF THE PREFERRED EMBODIMENTS

Figure 1:
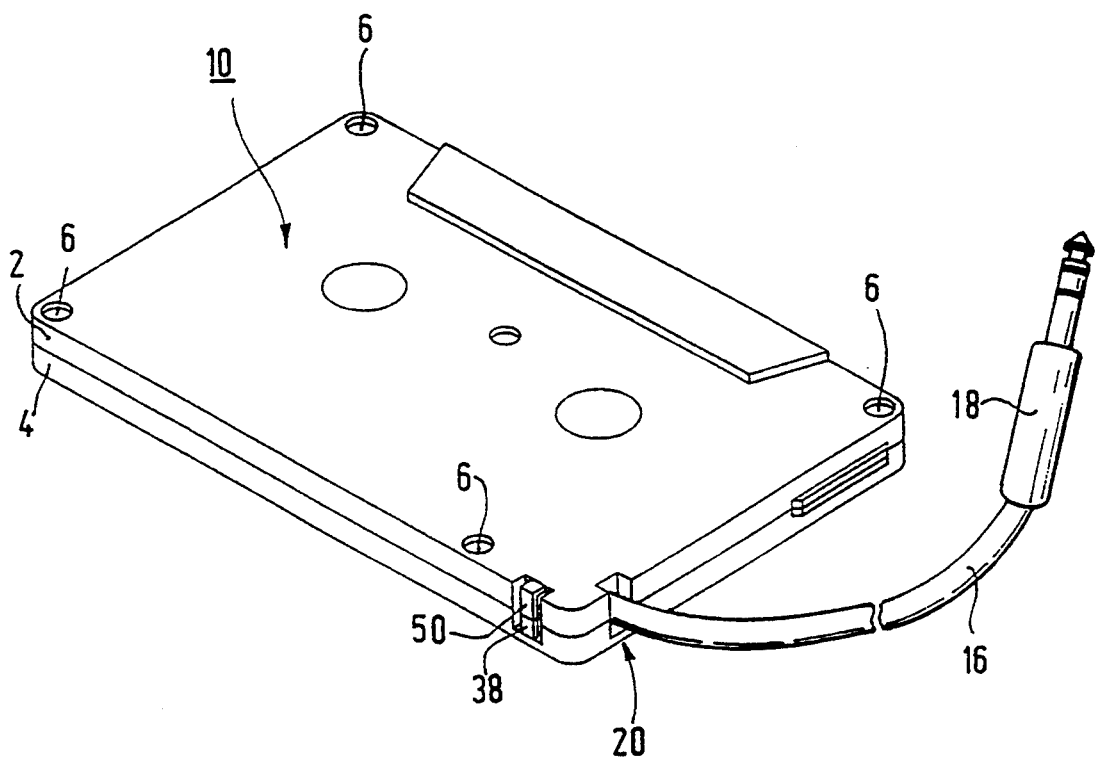
FIG. 1 shows a perspective view of the adapter.
Figure 2A:
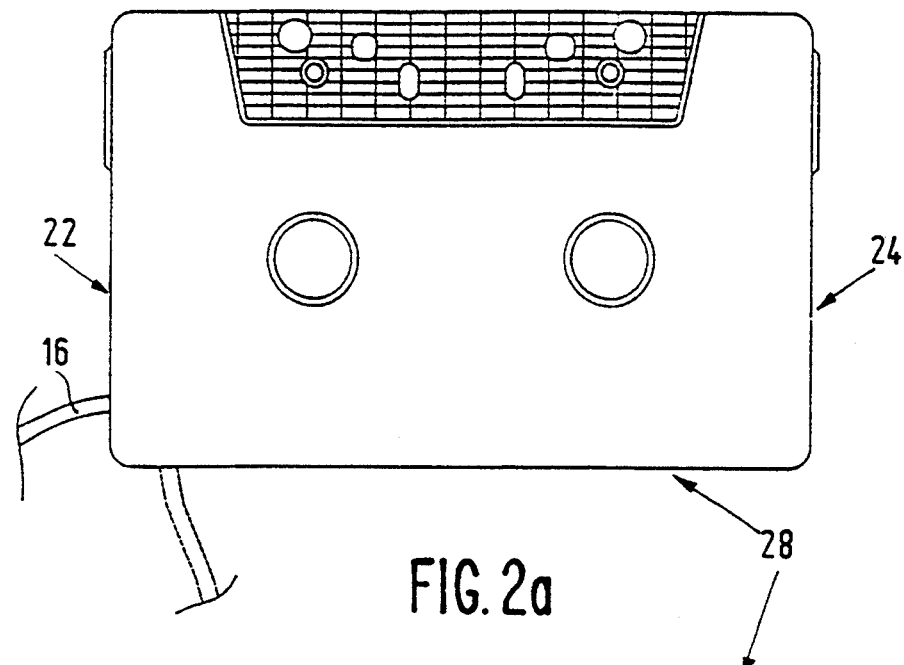
FIG. 2 various views on the adapter.
Figure 2B:
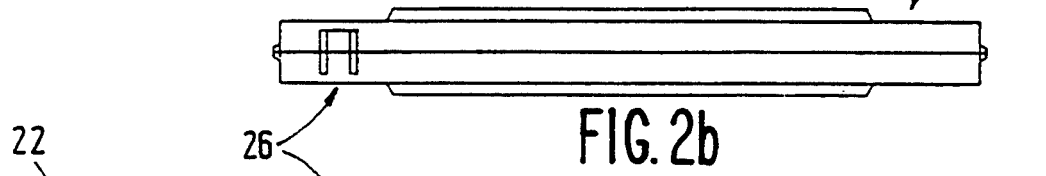
Figures 2C, 2D:
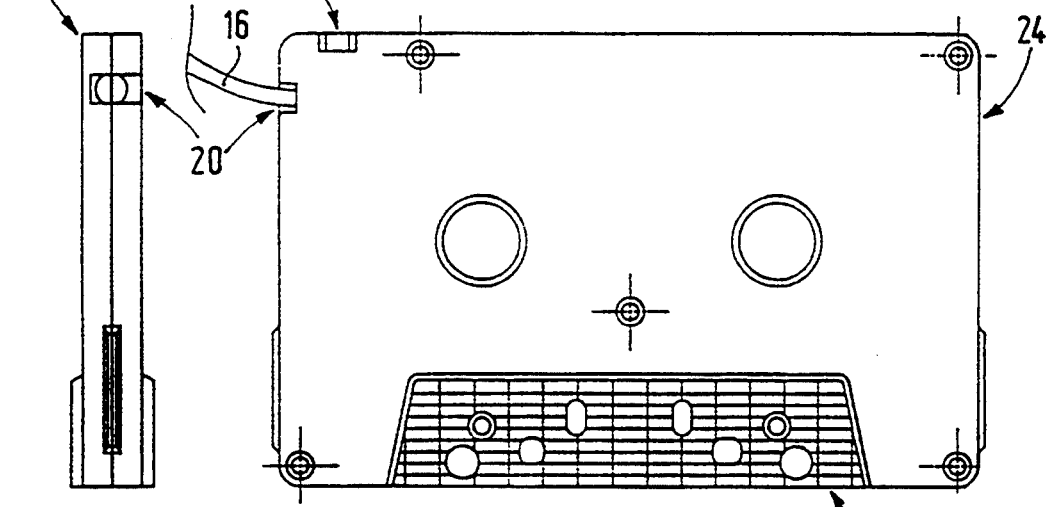
Figure 2E:
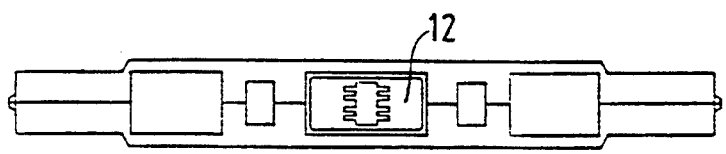

FIG. 1 shows a perspective view, and FIG. 2 shows various side views of the adapter. The adapter is for enabling signals produced by a signal source (not shown), such as a CD player, to be reproduced as audio sounds by a cassette player audio system comprising a cassette audio playback deck of the front-loading type or the side-loading type. The adapter comprises a housing 10 of a configuration of a cassette normally used with said playback deck. The present embodiment is in the form of a standard compact cassette, but other types of cassettes are equally well possible, such as an 8-track cassette, or the more recently introduced DCC cassette. The adapter comprises two separate housing pans 2 and 4 screwed together by means of screws 6.

FIG. 1 shows the adapter after final assembly of said adapter for consumer use.

A record head 12 (FIG. 2) is supported in a peripheral front wall 14 of said housing 10 in a position for contacting a playback head of a playback deck. Electrical conducting means 16, in the form of a three lead electrical wire, is located partly within said housing and extends from said housing. The conducting means 16 have one end electrically coupled to said record head, which is in this ease a stereo record head, for providing a stereo audio signal to said record head 12. A connector means 18, in the form of a headphone jack, is coupled to an other end of the said electrical conducting means 16, for receiving the audio signals from the audio source, such as the previously mentioned CD player. A first opening 20 is provided in a peripheral side wall 22 of said housing 10, via which the conducting means 16 extends from said adapter from the sidewall thereof. In this position of the connecting means 16, the adapter may be used with a playback deck of the side loading type. When positioning the adapter in such a playback device, the adapter is inserted with its other side wall 24 first into the playback device.

Means 26 are provided in a peripheral rear wall 28 of said housing 10 for enabling the conducting means 16 to extend from said adapter from the rear wall thereof, such that the adapter may be used with a playback deck of the front-loading type. The means 26 are in the form of a preformed second opening.

Figure 3A:
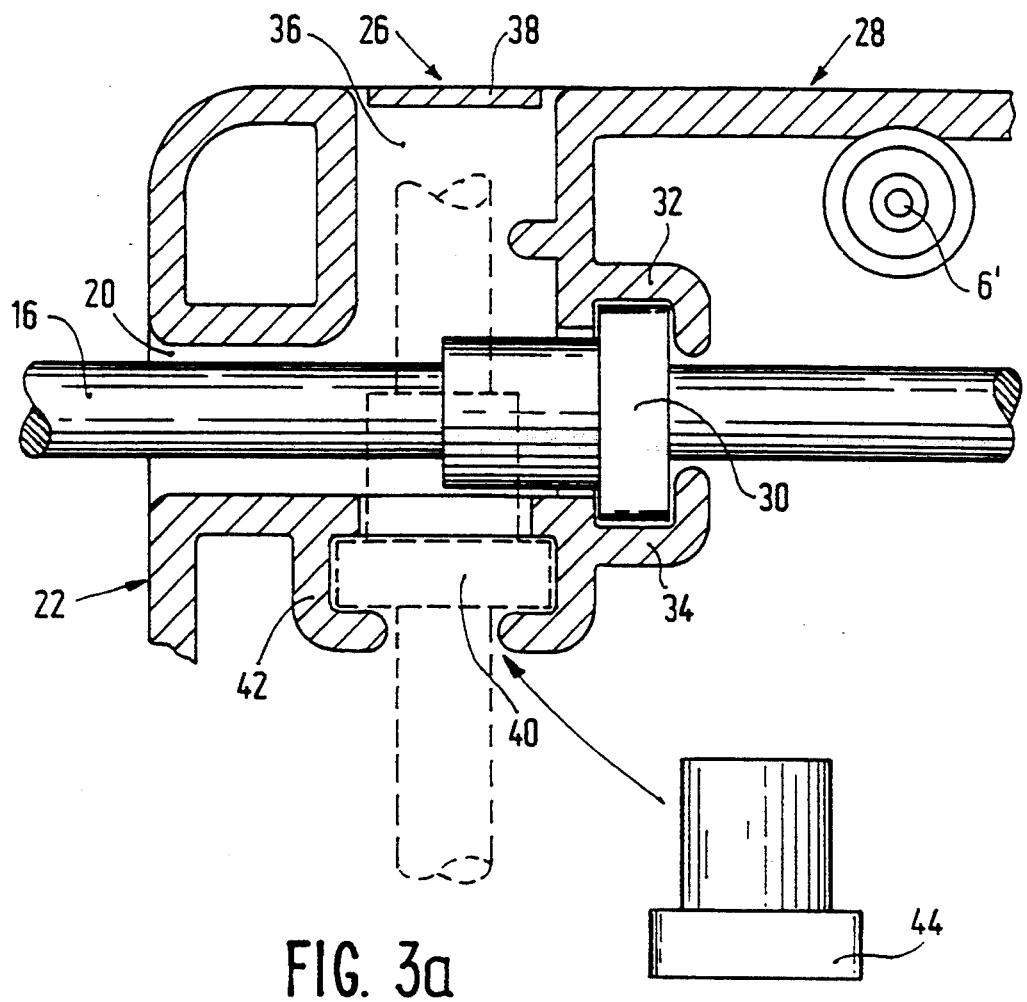
FIG. 3a a top view and FIG. 3b a side view of one of the housing parts of the adapter.
Figure 3B:
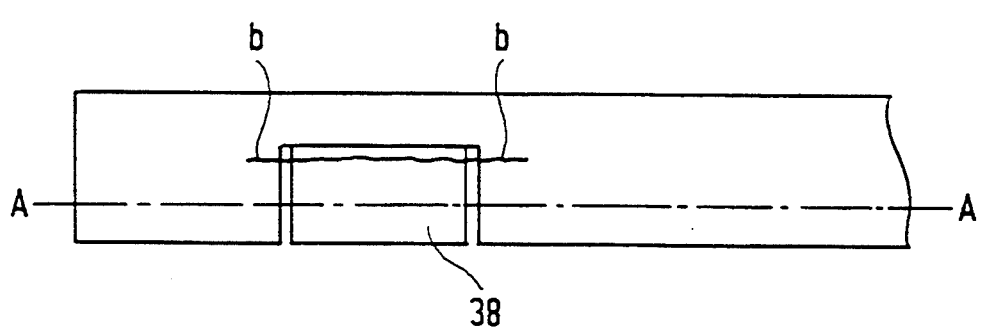

The means 26 in the peripheral rear wall 28 are shown in more detail in FIGS. 3a and 3b. FIGS. 3a and 3b show two views on the housing pan 4 of the adapter, when separated from the other housing pan 2. FIGS. 3a shows a cross section along the line A—A in FIG. 3b.

The view in FIG. 3a shows the electrical connecting means 16 positioned in the first opening 20. The connecting means 16 are fixedly positioned in the opening 20 by means of a clamping unit 30. The clamping unit 30 is positioned in a space formed by the walls 32 and 34.

The means 26 in the rear wall 28 comprises a second opening 36 and closure means 38. The closure means 38 is in the form of a break-away piece largely coveting the opening 36. The break-away piece 38 can be broken away along the line b—b in FIG. 3b. This enables the connecting means 16 to be repositioned from the position shown in solid lines into the position shown in broken lines. Now the clamping unit 30 is positioned in the space 40 formed by the wails 34 and 42. In this second position, the wire 16 extends from the rear wail 28 through the opening 36, as shown by broken lines as well in the bottom view of FIG. 2. The closure means can in addition comprise a plug 44, which in the original position of the wire 16, is positioned in the space 40. Upon repositioning the wire 16, the plug should be taken from the space 40, and can be positioned in the space 30. This results in a dust free closure of both openings 20 and 36.

Figure 4A:
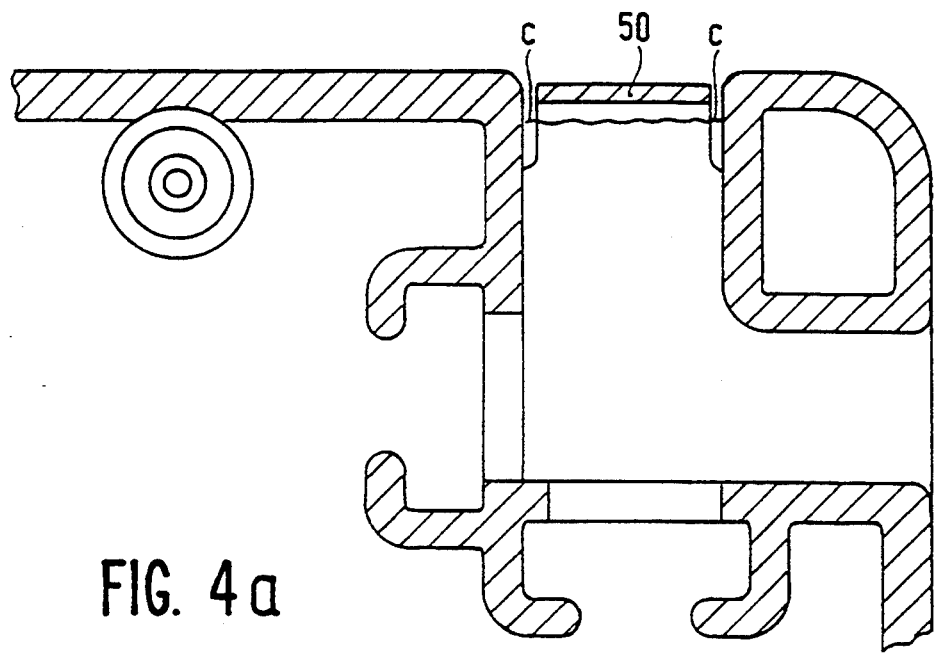
FIG. 4a a top view and FIG. 4b a side view of the other housing part.
Figure 4B:
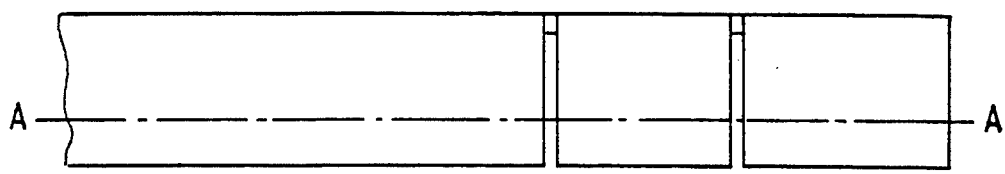

FIGS. 4a and 4b show the corresponding other housing part 2, provided with a break-away piece 50 that can be broken away along the line c—c, so as to realize (that part of) the second opening 36 (in the housing part 2). It should be noted that it is not necessary to provide both housing pans with a break-away piece. It could have been possible to provide the housing pan 4 with a break-away piece only. The two housing parts 2 and 4 are screwed together by means of screws, as has been said earlier. The holes denoted 6' are the holes for those screws.

Figure 5:
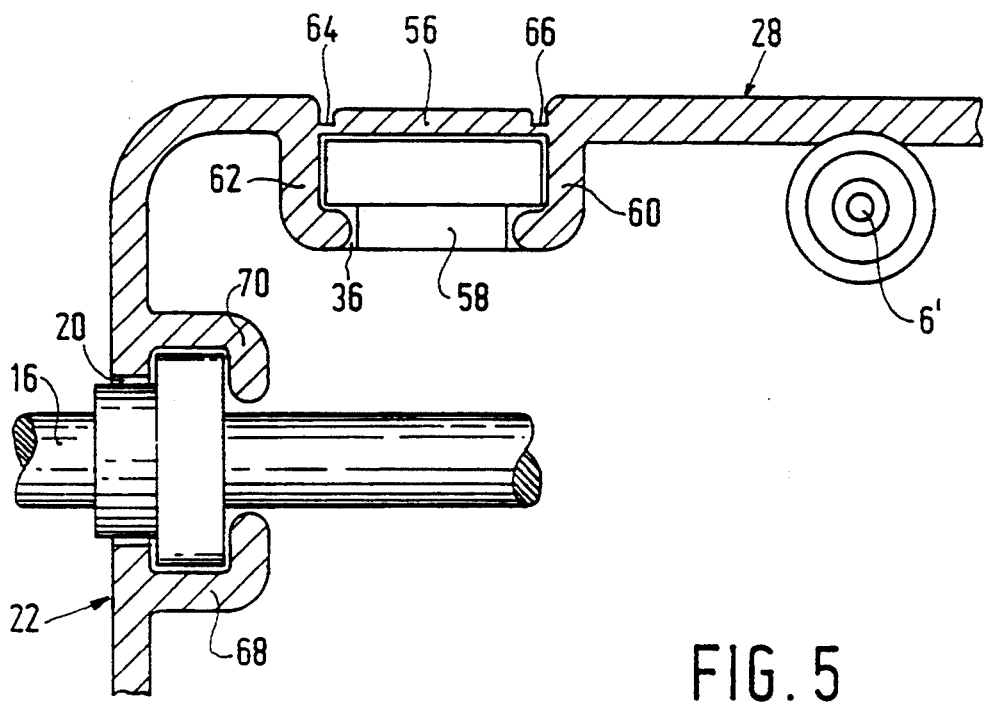
FIG. 5 a top view of another embodiment of one of the housing parts.

FIG. 5 shows a different construction of the housing part 4. The electrical connecting means 16 are again positioned in the first opening 20, so that it extends from the sidewall 22 of the housing. The preformed opening 36 is closed by a break-away piece 56 and further a closure plug 58 is positioned in the space formed by the wails 60 and 62. The break-away piece 56 can be broken away along the thinner pans 64 and 66, so as to realize the second preformed opening. The plug 58 should be taken out to enable the positioning of the wire 16 in the second opening 36. The plug 58 can be positioned in the space formed by the walls 68 and 70, so as to close the opening 20.

Figure 6:
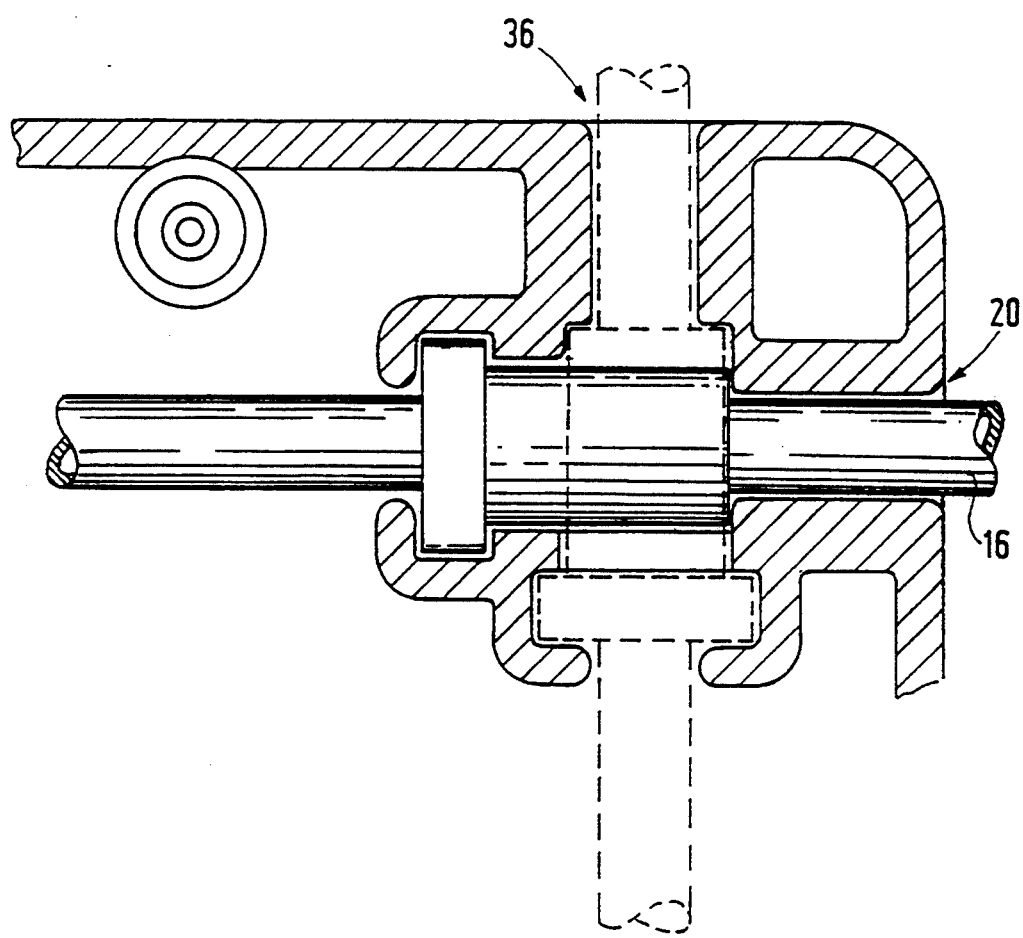
FIG. 6 a top view of again another embodiment of one of the housing parts.

FIG. 6 shows a construction where the electrical conductor 16 itself forms the closure means. FIG. 6 shows on of the two cassette housings. The other can be mirror symmetric. The conductor 16, the first opening 20 and the second opening 36 are shaped such that, when the conductor 16 is positioned in the first opening 20, it closes the second opening 36, so that no dust can enter the cassette housing. In the same way, when the conductor 16 is positioned in the second opening 36, it closes the first opening 20, so that no dust can enter the cassette housing. To that purpose, the housing walls closely nestle against the conductor wall.

We claim:

1. An adapter for enabling signals produced by a signal source to be reproduced as audio sounds by a cassette player audio system comprising a cassette audio playback deck of the front-loading type or the side-loading type, wherein a cassette is normally positioned in use substantially completely within the confines of said cassette playback deck, said adapter comprising:
   a housing of a configuration of a cassette normally used with said playback deck,
   a record head supported in a peripheral front wall of said housing in a position for contacting a playback head of said playback deck,
   electrical conducting means located partly within said housing and extending from said housing, the conducting means having one end electrically coupled to said record head for providing audio signals to said record head,
   connector means coupled to an other end of the said electrical conducting means, for receiving the audio signals for providing to the record head,
   a first opening in a peripheral side wall of said housing, for enabling the conducting means to extend from said adapter from the sidewall thereof, such that the adapter may be used with a playback deck of the side loading type,
   means being provided in a peripheral rear wall of said housing opposite said record head for enabling the conducting means to extend from said adapter from the rear wall thereof, such that the adapter may be used with a playback deck of the front-loading type,
characterized in that the electrical conducting means are fixedly positioned in said first opening after final assembly of said adapter for consumer use, the means provided in said peripheral rear wall comprising a preformed second opening and closure means for closing said second opening, the housing comprising two housing parts being assembled by means of releasable assembling means so as to enable a de-assembling of both housing parts, the electrical conducting means being releasably positioned in said first opening in one of said housing parts after de-assembly of said housing parts so as to enable a repositioning of the conducting means from the first opening into the preformed second opening after removing the closure means, that the electrical conducting means are fixedly positioned in said second opening after the subsequent assembly of said adapter for use of said adapter with said playback deck of the front-loading type.

2. Adapter as claimed in claim 1, characterized in that the closure means comprise break-away means for breaking away so as to obtain said preformed second opening.

3. Adapter as claimed in claim 2, characterized in that the closure means further comprise a releasable closure body, and that the releasable closure body and said first opening are shaped so as to position the closure body in said first opening for enabling the closure body to close said first opening when the conducting means are fixedly positioned in the preformed second opening after the subsequent assembly of said adapter.

4. Adapter as claimed in claim 1, characterized in that the closure means are in the form of releasable closure means being accommodated in said preformed second opening.

5. Adapter as claimed in claim 1, characterized in that said closure means and said first opening are shaped so as to position the closure means in said first opening for enabling the closure means to close said first opening when the conducting means are fixedly positioned in the preformed second opening after the subsequent assembly of said adapter.

6. Adapter as claimed in claim 1, wherein the first opening and the preformed second opening are located near the corner between said peripheral side and rear wall, characterized in that the electrical conducting means are shaped such so as to form the closure means, and that the first and second openings are shaped such that, when the electrical conducting means is positioned in the first opening, it closes the second opening, and when the electrical conducting means is positioned in the second opening, it closes the first opening.

7. Adapter as claimed in claim 6, characterized in that the closure means further comprise break-away means for breaking away so as to obtain said preformed second opening.

8. An adapter for enabling signals produced by a signal source to be reproduced as audio sounds by a cassette player audio system comprising a cassette audio playback deck of the front-loading type or the side-loading type, wherein a cassette is normally positioned in use substantially completely within the confines of said cassette playback deck, said adapter comprising:
   a housing of a configuration of a cassette normally used with said playback deck,
   a record head supported in a peripheral front wall of said housing in a position for contacting a playback head of said playback deck,
   electrical conducting means located partly within said housing and extending from said housing, the conducting means having one end electrically coupled to said record head for providing audio signals to said record head,
   connector means coupled to an other end of the said electrical conducting means, for receiving the audio signals for providing to the record head,
   a first opening in a peripheral rear wall of said housing opposite said record head, for enabling the conducting means to extend from said adapter from the rear wall thereof, such that the adapter may be used with a playback deck of the front loading type,
   means being provided in a peripheral side wall of said housing, for enabling the conducting means to extend from said adapter from the side wall thereof, such that the adapter may be used with a playback deck of the saide-loading type,
characterized in that the electrical conducting means are fixedly positioned in said first opening after final assembly of said adapter for consumer use, the means provided in said peripheral side wall comprising a preformed second opening and closure means for closing said second opening, the housing comprising two housing parts being assembled by means of releasable assembling means so as to enable a de-assembling of both housing parts, the electrical conducting means being releasably positioned in said first opening in one of said housing parts after de-assembly of said housing parts so as to enable a repositioning of the conducting means from the first opening into the preformed second opening after removing the closure means, that the electrical conducting means are fixedly positioned in said second opening after the subsequent assembly of said adapter for use of said adapter with said playback deck of the side-loading type.

9. Adapter as claimed in claim 4, characterized in that said closure means and said first opening are shaped so as to position the closure means in said first opening for enabling the closure means to close said first opening when the conducting means are fixedly positioned in the preformed second opening after the subsequent assembly of said adapter.

* * * * *